United States Patent [19]

Madura

[11] Patent Number: 5,137,298

[45] Date of Patent: Aug. 11, 1992

[54] FIFTH WHEEL LOCKING DEVICE

[75] Inventor: Francis E. Madura, Whiting, Ind.

[73] Assignee: Amsted Industries, Inc., Chicago, Ill.

[21] Appl. No.: 656,451

[22] Filed: Feb. 19, 1991

[51] Int. Cl.$^5$ .................. B62D 53/10; B62D 53/12
[52] U.S. Cl. .................... 280/434; 280/437
[58] Field of Search .................. 280/434, 436, 437

[56] References Cited

U.S. PATENT DOCUMENTS

| | | | |
|---|---|---|---|
| 2,838,326 | 6/1958 | Georgi | 280/434 |
| 2,861,818 | 11/1958 | Kayler et al. | 280/434 |
| 4,871,182 | 10/1989 | Altherr et al. | 280/434 |

FOREIGN PATENT DOCUMENTS 1234962  6/1971  United Kingdom ............... 280/434

Primary Examiner—Mitchell J. Hill
Attorney, Agent, or Firm—Edward J. Brosius; F. S. Gregorczyk

[57] ABSTRACT

A fifth wheel for an over the road tractor having a locking bolt that may be cocked so as to latch and unlatch respecting movement to engage a king pin retaining jaw.

4 Claims, 2 Drawing Sheets

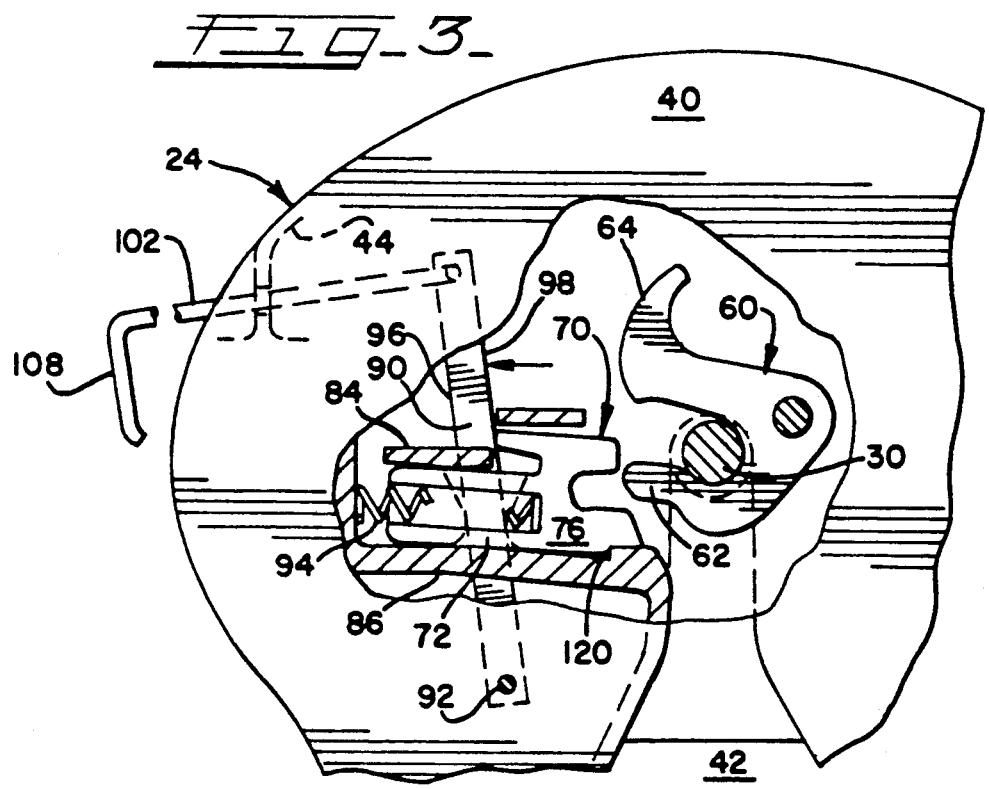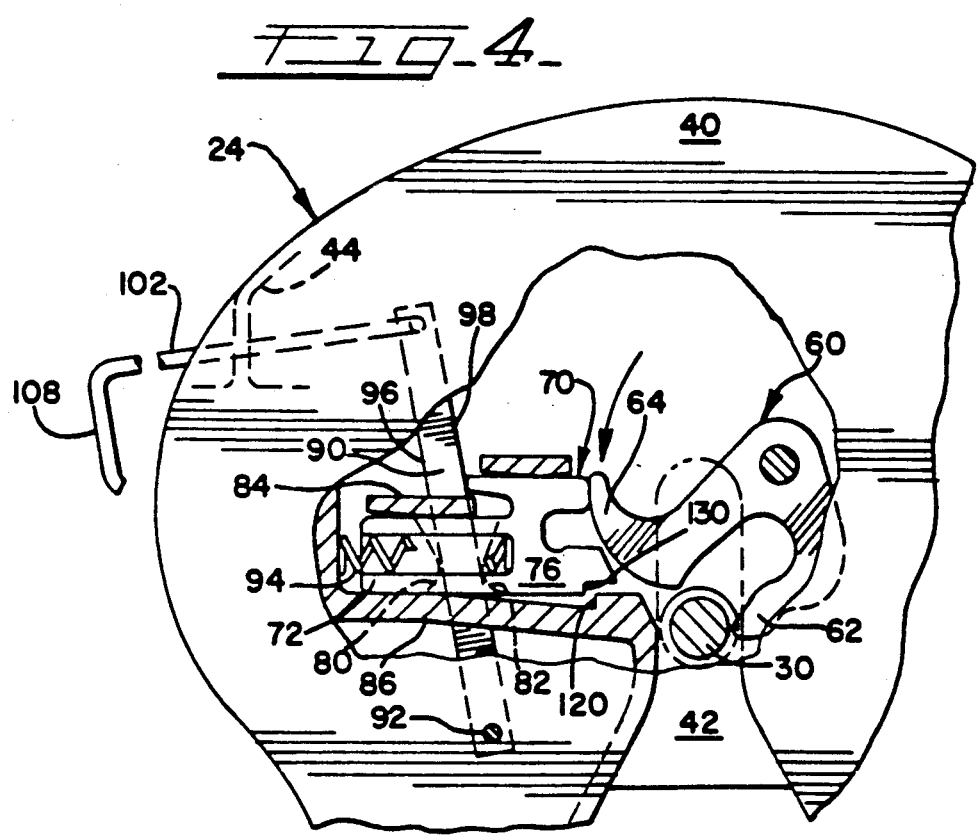

FIFTH WHEEL LOCKING DEVICE

FIELD OF INVENTION

The present invention relates to fifth wheels for over the road tractors and more particularly to an improved and simplified fifth wheel locking mechanism.

BACKGROUND OF THE INVENTION

Typical fifth wheel devices known in the industry are illustrated in prior U.S. Pat. Nos. 2,861,818 to Kayler et al and 4,871,182 to Altherr et al, the disclosures of which are incorporated herein by reference. Such fifth wheel devices include a plate which supports the forward bed plates of a trailer. A king pin is fixed to the trailer bed plate and extends into a center opening of the fifth wheel plate. Fifth wheels have included a pivotally mounted jaw under the plate to engage and hold a king pin against horizontal withdrawal. Normally, the jaw automatically closes and is engaged by a spring loaded bolt or bar to become locked on the king pin as the tractor and trailer are brought together. However, there is typically also a mechanism provided to extract and hold the locking bolt so as to unlock the jaw and permit horizontal release of the king pin to allow separation of tractor and trailer when the trailer is stationary and the tractor is powered forward. That mechanism is normally operable manually by a driver or assistant and usually includes safeguards so as to avoid accidental king pin release. The driver or assistant must dismount the truck, unlock the jaw and then remount the tractor before it is powered forward.

In the prior designs, illustrated in the aforementioned patents, that mechanism to extract and hold the locking bolt has included an operating rod that had to be both pulled linearly away from the fifth wheel and simultaneously lifted or twisted so as to latch and hold the bolt against premature return to reengage the pivotable jaw before the driver separated the tractor and trailer. Such lifting and twisting motions are difficult to perform particularly for small stature drivers, and require a relatively large space between tractor frame and trailer bed for manipulation of the operating rod.

Thus it would be advantageous if the lifting and twisting motion required for a fifth wheel operating rod could be eliminated and if the locking bolt could be modified so as to self latch and unlatch for properly sequenced engagement with the fifth wheel jaw.

SUMMARY OF THE PRESENT INVENTION

Accordingly, it is a principal object of the present invention to devise a self latching locking bolt for a fifth wheel.

Another object of the present invention is to devise an improved fifth wheel having an operating rod for unlocking its jaw which operating rod requires only straight lineal movement.

The present invention involves a locking bolt that slides between two guide ribs on the underside of a fifth wheel wherein both ribs have tapered surfaces to permit the locking bolt to cock slightly forward and aft of the fifth wheel, and adjacent surfaces of the locking bolt and one guide rib are cooperatively and congruently stepped so as to latch the locking bolt against inward jaw engaging movement when the steps are interfitted.

BRIEF DESCRIPTION OF THE DRAWINGS

Further objects and advantages of the invention will become apparent upon reading the following detailed description in conjunction with the drawings wherein:

FIG. 3 is a partial view similar to FIG. 2 with the locking bolt withdrawn from the jaw and latched against premature return; and FIG. 4 is a partial view similar to FIGS. 2 and 3 with the jaw open and ready to receive a king pin and the locking bolt is unlatched and ready to return to engage and lock the jaw.

DETAILED DESCRIPTION OF THE INVENTION

Figure 1:
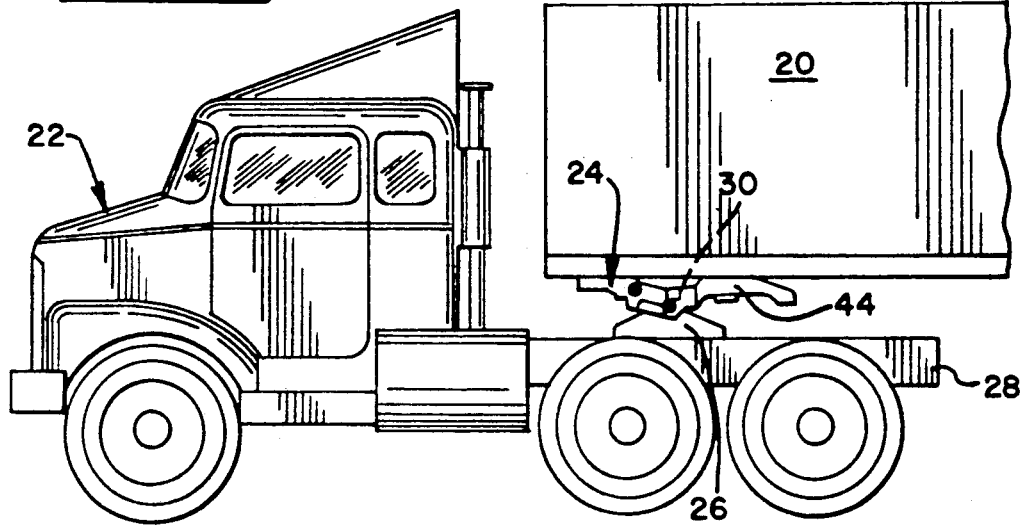
FIG. 1 is a side elevation view of a trailer and a tractor with a fifth wheel.
Figure 2:
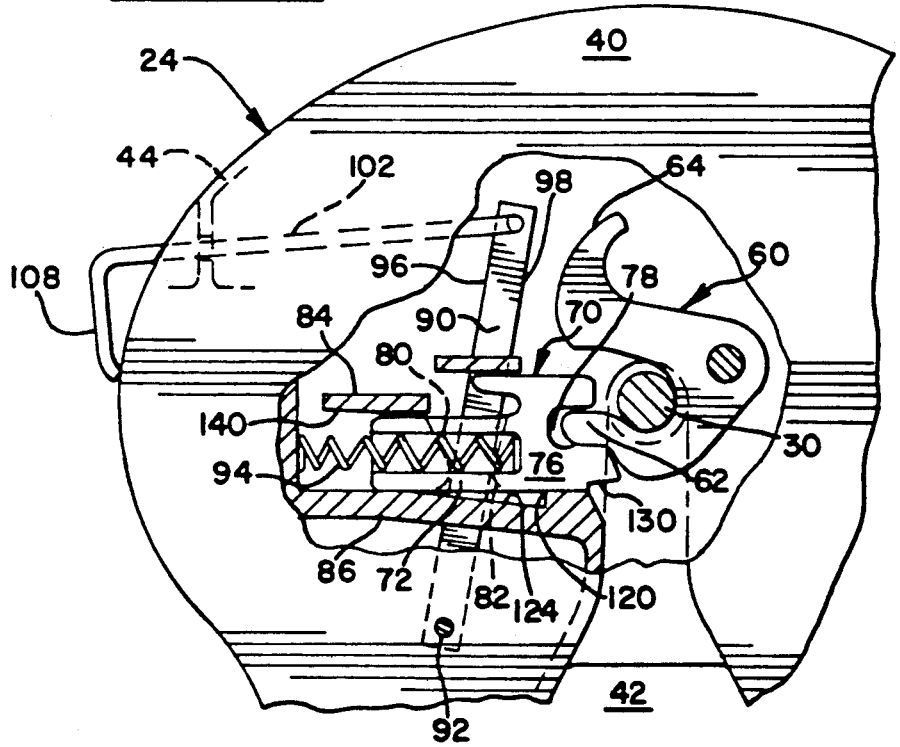
FIG. 2 is a partial plan view of a fifth wheel with parts removed to show the locking bolt of the present invention engaged with the jaw which is in a closed and locked position.

As seen in FIG. 1 an over the road trailer 20 and tractor 22 are connected by a fifth wheel generally 24, which is pivotally mounted on brackets 26 secured to the tractor frame 28, and a king pin 30 is secured to the underside of the forward bed plate of the trailer 20. As shown in FIGS. 2-4, the trailer support plate 40 of the fifth wheel contains an open "V" slot 42 to receive (and release) the trailer king pin 30; and the underside of the support plate 40 is reinforced with a peripheral skirt 44 and various radial and transverse webs, not shown. A jaw generally 60 is pivotally mounted to the underside of the fifth wheel plate 40 and is positioned to swing across the apex of the "V" slot 42. The jaw 60 is bifurcated into detent portion 62 and a foot portion 64 with an opening therebetween. In FIG. 2 the jaw 60 is shown in a first closed and locked position with the reduced neck portion of a king pin 30 captured therein. This closed position of the jaw 60 is automatically assumed when a trailer 20 is relatively moved forwardly onto the fifth wheel 24 so as to advance the king pin 30 through the slot 42 and against the inner portion of jaw foot 64.

A locking mechanism generally 70 is slidingly engageable with the jaw detent 62 when the jaw 60 is in the closed reference position and thereby locks the jaw 60 closed, as illustrated in FIG. 2. Locking mechanism 70 includes a locking bolt 72 that is slidable inwardly and outwardly, respective to the jaw 60, between a pair of guide ribs 84, 86 on the underside of the fifth wheel 24. Locking bolt 72 carries a clamp head 76 having an opening 78 to receive the jaw detent 62. The bolt 72 also carries a curved release shoulder 80 spaced from a curved rear face 82 of the clamp head 76. A locking lever 90, having an outer edge 96 and inner edge 98, is pivotally mounted to the underside of fifth wheel plate 40 by a pivot pin 92 and extends through the space between the rear face 82 of the clamp head 76 and the release shoulder 80; and the swingable end of lever 90 is connected to an end of an operating rod 102 that extends outwardly through the skirt 44 of the fifth wheel 24 and terminates as a handle 108. It will be seen that the locking bolt 72 has a cavity receiving a compression spring 94 that extends outwardly (away from the jaw 60) onto a web formed on the underside of the fifth wheel 24. Thus the compression spring, 94 biases the locking bolt 72 to move inwardly toward the jaw 60; and the locking lever 90 can be swung inwardly or outwardly to alternately push against the rear face 82 of clamp head 76 and the release shoulder 80 to thereby respectively move the locking bolt inwardly and outwardly of the jaw 60. It is important to the present invention that the geometry of the release shoulder 80 and clamp head rear face 82 places the narrowest spacing, and contact with the respective edges 96 and 98 of the locking lever 90, at a position below the center line of spring 94 (as viewed in FIGS. 2-4).

When a trailer king pin 30 is captured by jaw 60 and the jaw detent 62 is engaged by the opening 78 of clamp head 76 (as shown in FIG. 2), the locking lever 90 and operating rod 102, will have been moved fully inwardly by action of the compression spring 94 and release shoulder 80 pushing the lever 90 clockwise. In this condition, the tractor and trailer will be road worthy. Upon the truck and trailer arriving at a destination where they are to be separated, the driver will pull the handle 108 and operating rod 102 outwardly to thereby pivot the rocking lever 90 counter clockwise (as shown in FIG. 3) to extract the locking bolt 72 to a second position disengaged from jaw detent 62. The jaw 60 is then free to swing open &o release the king pin 30 as the tractor 22 is powered forward to move out from under the trailer 20. When that occurs the foot portion 64 of the jaw will be swung against the clamp head 76 of the locking bolt 72 (as shown in FIG. 4) so as to prevent from returning inwardly until another king pin horizontally transits the "V" slot 42 and enters jaw 60 which movement will close the jaw 60 and swing the jaw foot portion 64 away from the locking bolt head 76. When the latter occurs, the compression spring 94 immediately drives the locking bolt inwardly to the first closed and locked position shown in FIG. 2.

According to the present invention, the locking bolt 72 is kept from premature reengagement with the jaw detent portion 62 by forming a step 120 and inclined surface 124 on the guide rib 86 and a corresponding mating step 130 on the adjacent end of the locking bolt clamp head 76. Also an inner surface 140 of the other bolt guide rib 86 is inclined parallel to surface 124. The inclined surfaces 124 and 140 of ribs 86, 88, respectively, permit the locking bolt 72 to slightly cock clockwise when the bolt 72 is withdrawn fully outwardly; and the mating steps 120, 130 will latch the bolt clamp head 76 when the bolt is thus cocked. Clockwise cocking will occur because the curved geometry of the release shoulder 80 places the point of contact with the outward edge 96 of locking lever 90 below the center line of the compression spring 94 and the inward force of the spring thus creates a clockwise moment about that point of contact. Thus when the lock bolt 72 is fully extracted by pulling straight out on handle 108 it will cock and latch as shown in FIG. 3. If the driver should then mistakenly push inward on the handle 108 the inward edge 98 of locking lever 90 will push against the rear face 82 of clamp head 76 creating a clockwise moment about the step 130 but the surface 140 of guide rib 84 would prevent the lock bolt 72 from further clockwise movement. However, upon the king pin 30 being separated horizontally, the jaw 60 will pivot counter clockwise bringing the foot portion 64 into contact with the upper portion of clamp head 76 as shown in FIG. 4. It will be seen in FIG. 4 that the foot portion 64 is contoured to actually push against the clamp head 76 above the spring 94 in an outward direction opposite the spring force urging the locking bolt inward and thus creating a counter clockwise moment on the locking bolt 72. Since the locking bolt 72 was previously cocked clockwise to the full extent permitted by the guide ribs 84 and 86, it will now be able to cock in the reverse, counter clockwise, direction sufficient to disconnect the step 130 of the clamp head 76 from the step 120 in the guide rib 86. Thus the locking bolt 72 will assume the unlatched position shown in FIG. 4 and will be moved inwardly (by the compression spring 94) immediately upon a king pin 30 entering the jaw 60 sufficiently to rotate the foot portion 64 clockwise out of contact with the clamp head 76. At that point, the lock bolt 72 will reengage the detent 62 of jaw 60 in the closed and locked position shown in FIG. 2.

The foregoing details have been provided to describe a best mode of the invention and further variations and modifications may be made without departing from the spirit and scope of the invention which is defined in the following claims.

What is claimed is:

1. A locking mechanism for a fifth wheel positioned on a tractor and engageable with a trailer having a king-pin, said fifth wheel having a periphery, an underside, and a v-slot extending into said fifth wheel from said periphery to an apex, a king-pin jaw in proximity to said apex, which jaw is pivotably mounted on said underside and operable at an engaged position to retain said king-pin and trailer at coupling with said tractor, said mechanism comprising:

a first guide rib and a second guide rib secured to and extending from said underside, each of said first and second guide ribs defining an internal and inclined surface, one of said first and second guide rib internal surfaces defining a first step;

a locking bolt positioned and slidable between said first and second guide ribs along said underside, said locking bolt couplable with and operable to secure said jaw at an engaged and reference position, and slidable to a jaw disengaged and second position generally along a line extending from said apex to said periphery, said locking bolt having an inward end in proximity to said king-pin jaw, an outward end generally in relative proximity to said periphery and defining a second step generally at said inward end, said locking bolt at said disengaged position pivotable in a first direction to pivot said inward end relative to said outward end between said first and second guide ribs along said fifth-wheel underside to mate said first step and said second step to secure said locking bolt from moving to contact and couple with said jaw.

2. A locking mechanism as claimed in claim 1 wherein said king-pin jaw further comprises a foot portion operable to contact said locking bolt inward end at said disengaged and jaw-open position for release and withdrawal of said king-pin, said foot portion operable at king-pin jaw closing to further displace said locking bolt outwardly along said line for disengagement of said mated first and second steps, and pivoting of said locking bolt in a second direction opposite said first direction against said fifth-wheel underside for locking engagement of said locking bolt and king-pin jaw to secure said king-pin.

3. A locking mechanism as claimed in claim 1, wherein said second step on said locking bolt is adjacent said first step and said one of said first and second guide ribs.

4. A locking mechanism as claimed in claim 1 further comprising means for biasing said locking bolt, which biasing means is positioned between said periphery and said outward end to bias said locking bolt to said jaw engaged position.

* * * * *